United States Patent
Kawano et al.

(10) Patent No.: US 8,607,236 B2
(45) Date of Patent: Dec. 10, 2013

(54) INFORMATION PROCESSING SYSTEM

(75) Inventors: Shinjiro Kawano, Tokyo (JP); Makoto Tensha, Tokyo (JP); Katsumi Shiraishi, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 798 days.

(21) Appl. No.: 12/064,414

(22) PCT Filed: Aug. 17, 2006

(86) PCT No.: PCT/JP2006/316161
§ 371 (c)(1),
(2), (4) Date: Apr. 26, 2010

(87) PCT Pub. No.: WO2007/023726
PCT Pub. Date: Mar. 1, 2007

(65) Prior Publication Data
US 2009/0254913 A1    Oct. 8, 2009

(30) Foreign Application Priority Data

Aug. 22, 2005  (JP) ................ 2005-239381

(51) Int. Cl.
*G06F 9/46* (2006.01)
(52) U.S. Cl.
USPC ........... 718/102; 718/100; 718/101; 718/103; 718/104; 718/105
(58) Field of Classification Search
None
See application file for complete search history.

(56) References Cited

U.S. PATENT DOCUMENTS

| 5,522,070 A | 5/1996 | Sumimoto |
| 6,128,657 A | 10/2000 | Okanoya et al. |
| 2002/0065870 A1* | 5/2002 | Baehr-Jones et al. ......... 709/201 |
| 2002/0069279 A1 | 6/2002 | Romero et al. |
| 2002/0198924 A1* | 12/2002 | Akashi et al. ................. 709/102 |
| 2004/0098718 A1 | 5/2004 | Yoshii et al. |

FOREIGN PATENT DOCUMENTS

| JP | 6-12392 A | 1/1994 |
| JP | 7-219907 A | 8/1995 |
| JP | 9-218842 A | 8/1997 |
| JP | 2000-293387 A | 10/2000 |
| JP | 2002-269062 A | 9/2002 |
| JP | 2004-171234 A | 6/2004 |
| JP | 2004-280371 A | 10/2004 |

OTHER PUBLICATIONS

International Search Report dated Nov. 14, 2006 (One (1) Page).

(Continued)

*Primary Examiner* — Emerson Puente
*Assistant Examiner* — Jonathan R Labud
(74) *Attorney, Agent, or Firm* — Crowell & Moring LLP

(57) ABSTRACT

An information processing system is provided to alleviate excessive load on a master node, thereby allowing the master node to efficiently perform the process of assigning jobs to nodes. A client 10 classifies a plurality of jobs constituting a large-scale arithmetic operation into several blocks, and requests a master node 20 to process the jobs block by block, such that the master node 20 always performs the process of assigning a predetermined number of jobs or less. Here, the predetermined number is preferably determined in such a manner as to allow the master node 20 to efficiently perform the process of assigning the jobs to nodes, even if the number of nodes is significant. As such, the client 10 has the function of controlling the load on the master node 20, and therefore it is possible to prevent the load on the master node 20 from increasing.

7 Claims, 7 Drawing Sheets

(56) References Cited

OTHER PUBLICATIONS

Form PCT/IP/338 (One (1) page); Form PCT/IPEA/409 (Four (4) pages).
Japanese-language First Notification for Reason for Refusal dated Dec. 15, 2009 (3 pages).
Japanese-language Second Notification for Reason for Refusal dated Mar. 15, 2010 (3 pages).
Japanese-language Decision of Refusal dated Jun. 3, 2010 (2 pages).
Japanese-language Decision to Grant a Patent dated Oct. 4, 2010 (3 pages).

* cited by examiner

FIG. 3

|  | CALCULATION DETAIL | VARIABLE |
|---|---|---|
| JOB "1" | $z_1 = x + y$ | $(x, y) = (1, 2), (2, 3), \cdots$ |
| JOB "2" | $z = z_1 \times x_1$ | $x_1 = 2, 3$ |
| JOB "3" | $z = x + y_1 + y_2$ | $(x, y_1, y_2) = (1, 2, 3), (2, 3, 4), \cdots$ |
| ⋮ | ⋮ | ⋮ |
| JOB "1000" |  |  |

FIG. 4

| | JOB GROUP ID | TARGET JOB | REQUEST COMPLETED | RECEIPT COMPLETED | |
|---|---|---|---|---|---|
| 1ST BLOCK | 001 | "1000" | 1 | 1 | LOAD ↑ HIGH |
| | 002 | "5" "6" "7" | 1 | 0 | |
| | 003 | "850" | 1 | 1 | |
| | 004 | "201" "202" | 1 | 0 | |
| | ⋮ | ⋮ | ⋮ | ⋮ | |
| | 300 | "520" | 1 | 0 | |
| 2ND BLOCK | 301 | "945" | 1 | 0 | |
| 3RD BLOCK | 302 | "955" | 0 | 0 | |
| ⋮ | ⋮ | ⋮ | ⋮ | ⋮ | |
| 300TH BLOCK | 599 | "102" | 0 | 0 | |
| 301ST BLOCK | 600 | "33" | 0 | 0 | ↓ LOW |

INFORMATION PROCESSING SYSTEM

TECHNICAL FIELD

The present invention relates to an information processing system in which a plurality of computers connected via a network share and execute processing of a large-scale arithmetic operation consisting of a plurality of jobs.

BACKGROUND ART

One of the techniques for enhancing efficiency of information processing by computers is distributed processing. Distributed processing is a parallel processing technique in which jobs are executed by a plurality of machines. The techniques for sharing processing among a plurality of machines include, in particular, those referred to as a "multiplexing system" and "grid computing".

Among them, the multiplexing system is a technique intended to protect data that has already been processed, or continue service being provided, at a time of trouble, such as machine failure. Therefore, in the case of the multiplexing system, a plurality of machines execute the same processing.

On the other hand, grid computing is typically a technique in which a plurality of computers and memory media are connected together via a network, and virtually handled as a large-scale, high-performance computer. For example, by allowing a plurality of computers to share and execute arithmetic processing that requires a large amount of calculation, it becomes possible to substantially quickly obtain arithmetic results.

Incidentally, to share arithmetic processing among a plurality of computers, a function of assigning jobs to machines is necessary. Such a function is implemented by a tool generally referred to as a "load balancer" or "load-sharing (load-distribution) software".

Next, general usage of the load balancer in grid computing will be described. FIG. 7 is a schematic configuration diagram of a conventional information processing system constructed based on the grid computing technique. As shown in FIG. 7, the information processing system includes a client 110, a master node 120, and four nodes 130a, 130b, 130c, and 130d. These machines 110, 120, 130a, 130b, 130c, and 130d are connected together via a network. The client 110 is the requester of a large-scale arithmetic operation. For example, it is assumed that the client 110 requests the master node 120 to carry out a large-scale arithmetic operation consisting of 1,000 jobs. Here, the "job" is a unit of calculation. For example, the job is to obtain "z" by the calculation "z=x+y". In this case, it is assumed that n sets of variables are substituted for x and y. Specifically, in a single job, the number of times calculation is carried out depends on the number of variables to be substituted. Accordingly, although the number of jobs is 1,000, the total number of calculations is dozens or hundreds of times greater than that number.

Here, the large-scale arithmetic operation, which the client 110 requests the master node 120 to carry out, is memorized in a predetermined memory device or the like. Data for the large-scale arithmetic operation is originally transmitted from another computer connected to the client 110 via a network, or inputted by a person in charge using an input device of the client 110. At this time, for example, the data for the large-scale arithmetic operation may be transmitted or inputted after being divided into a predetermined number (e.g., 1,000) of jobs, or transmitted or inputted without being divided into the predetermined number of jobs. In the latter case, the client 110 divides the transmitted or inputted data for the large-scale arithmetic operation into the predetermined number of jobs in accordance with predetermined rules. Hereinafter, unless otherwise specified, descriptions will be given with respect to the case where the data for the large-scale arithmetic operation is transmitted or inputted to the client after being divided into 1,000 jobs.

The master node 120 is a computer responsible for the load balancing function, and performs the process of assigning jobs to the nodes 130a, 130b, 130c, and 130d. As for the job assignment, some techniques have been proposed, in which a suitable number and size of jobs are transmitted to each node in accordance with, for example, performance and load status of the node (see, for example, patent literature 1 and patent literature 2). In addition, the nodes 130a, 130b, 130c, and 130d are computers for carrying out arithmetic processing of the jobs assigned by the master node 120.

The client 110 first receives the data for the large-scale arithmetic operation consisting of 1,000 jobs, and then transmits the 1,000 jobs to the master node 120. Next, the master node 120 assigns the received 1,000 jobs to the nodes 130a, 130b, 130c, and 130d. The nodes 130a, 130b, 130c, and 130d carry out arithmetic processing of the jobs transmitted from the master node 120, and upon completion of the processing, they report to the master node 120 that the jobs have been completed. Upon receipt of such a report from any node, if there is any unprocessed job that has not yet been assigned, the master node 120 transmits the job to that node. As such, the master node 120 repeats both the process of transmitting any unprocessed job to each node, and the process of receiving a report that the job has been completed, thereby causing the four nodes 130a, 130b, 130c, and 130d to execute arithmetic processing of all the jobs.

In addition, the master node 120 simply implements the function of efficiently assigning the jobs requested by the client 110 to the nodes 130a, 130b, 130c, 130d, and it does not perform any data processing on results of arithmetic processing by the nodes 130a, 130b, 130c, and 130d. Basically, there is a premise that the results of arithmetic processing by the nodes 130a, 130b, 130c, and 130d ultimately aggregate in the client 110, which is the requester of the large-scale arithmetic operation. Therefore, for example, when a result of arithmetic processing is returned from any of the nodes 130a, 130b, 130c, and 130d, the master node 120 is required to transmit the arithmetic processing result to the client 110.

Patent Literature 1: Japanese Unexamined Patent Application Publication No. H07-219907
Patent Literature 2: Japanese Unexamined Patent Application Publication No. 2002-269062

DISCLOSURE OF INVENTION

Technical Problem

As described above, the master node performs the job assignment process of suitably assigning and transmitting one job after another to each node under its control, while monitoring the processing and load status of the node. However, as the number of nodes under control of the master node increases, a more significant load is put on the master node during the job assignment process, simply by monitoring the processing and load status of each node. Moreover, the master node performs an optimization process for assigning suitable amounts of jobs to suitable nodes in accordance with the processing and load status of each node, and such an optimization process itself also creates a high load.

In addition, as the number of jobs that the client requests the master node to process increases, the master node more frequently performs the process of transmitting to the client an arithmetic processing result returned from each of the nodes. Therefore, the load on the master node in terms of transmission of the arithmetic processing results might increase, resulting in a reduced processing speed of the job assignment process, which is essentially the most important process to be performed by the master node.

Furthermore, even when the number of nodes is not significantly high, as the number of requested jobs increases, the load on the master node in terms of selection of suitable jobs during the job assignment process increases, and an extra load is created in terms of maintenance of the connection with the client to meet a request from the client to monitor the processing results. Also, the load on the client in terms of monitoring of the job processing results increases as the number of jobs to be requested of the master node increases.

To overcome these problems, for example, there has been some demand to implement an information processing system having a mechanism of controlling the load on the master node itself.

The present invention has been made in view of the above circumstances, and an objective thereof is to provide an information processing system capable of alleviating excessive load on the master node, thereby allowing the master node to efficiently perform its essential function, i.e., the process of assigning jobs to each node.

Solution to Problem

The subject matter as claimed in claim 1 to achieve the above objective is directed to an information processing system comprising a client for requesting processing of a large-scale arithmetic operation consisting of a plurality of jobs, a plurality of nodes for executing processing of the jobs, and a master node for assigning processing of the jobs requested by the client to the nodes, the client, the nodes, and the master node being connected together via a network, wherein the client classifies the jobs constituting the large-scale arithmetic operation, which are memorized in a memory means, into several blocks, and requests the master node to process the jobs block by block, such that the master node always assigns a predetermined number of jobs or less.

The subject matter as claimed in claim 2 is directed to the information processing system according to claim 1, wherein the client classifies the jobs constituting the large-scale arithmetic operation, such that a predetermined number of jobs belong to a first block, and other jobs each belong to an nth block, where n=2, 3, . . . , N, and the client first requests the master node to process the predetermined number of jobs in the first block, and then requests the master node to process a predetermined one of the blocks that have not yet been processed upon each receipt of a notification from the master node, indicating that processing of one job has been completed.

The subject matter as claimed in claim 3 is directed to the information processing system according to claim 1 or 2, wherein the client estimates a processing load per job included in the large-scale arithmetic operation, and requests the master node to process the jobs in order from the highest load to the lowest load in accordance with estimation results.

The subject matter as claimed in claim 4 to achieve the above objective is directed to a computer-readable recording medium having recorded thereon a program for causing a computer to implement a function of an information processing system according to any one of claims 1, 2, and 3.

The subject matter as claimed in claim 5 to achieve the above objective is directed to a program for causing a computer to implement a function of an information processing system according to any one of claims 1, 2, and 3.

The subject matter as claimed in claim 6 to achieve the above objective is directed to an information processing device for requesting a load balancer to process a large-scale arithmetic operation consisting of a plurality of jobs, the device including: a grouping process means for grouping the jobs constituting the large-scale arithmetic operation, which are memorized in a memory means, based on grouping rule information memorized in the memory means, thereby forming several job groups; and a management means for requesting the load balancer to process the job groups formed by the grouping process means, such that the load balancer always processes a predetermined number of job groups or less.

The subject matter as claimed in claim 7 is directed to the information processing device according to claim 6, further comprising a load estimation means for estimating a processing load per job group formed by the grouping process means based on the load estimation rule information memorized in the memory means, wherein based on a processing load estimation result per job group, which is obtained by the load estimation means, the management means requests the load balancer to process the job groups in order from the highest load to the lowest load.

The subject matter as claimed in claim 8 to achieve the above objective is directed to a program for causing a computer to implement a function of an information processing device according to claim 6 or 7.

Advantageous Effects of Invention

In the subject matter as claimed in claim 1, the client classifies the jobs constituting the large-scale arithmetic operation into several blocks, and requests the master node to process the jobs block by block, such that the master node always assigns a predetermined number of jobs or less. Thus, the client can request the master node to process a plurality of jobs little by little in units of blocks into which the jobs are classified such that each block consists of small-scale jobs, rather than simultaneously requesting the master node to carry out processing of all the jobs as in the conventional art. Here, the number of jobs to be included in each block is suitably determined within the range between 1 and the predetermined number. In addition, the predetermined number is preferably determined in such a manner as to allow the master node to efficiently assign the jobs to the nodes, even if the number of nodes is significant. Such a client conceivably has the function of controlling the load on the master node. Thus, the master node is simply required to always perform the process of assigning the predetermined number of jobs or less to the nodes, and therefore it is possible to prevent the load on the master node from increasing. Moreover, since the load on the master node can be reduced as such, the master node can efficiently carry out not only the process for assigning jobs to the nodes, but also the process for meeting the client's demand to monitor arithmetic results. Furthermore, the number of jobs the client requests the master node to process is reduced, and therefore the load on the client in terms of the process of monitoring the arithmetic results is reduced.

In the subject matter as claimed in claim 2, the client classifies the jobs constituting the large-scale arithmetic operation, such that a predetermined number of jobs belong to the first block, and other jobs each belong to the nth block, where n=2, 3, . . . , N, and the client first requests the master node to process the predetermined number of jobs in the first block, and then requests the master node to process a predetermined one of the blocks that have not yet been processed upon each receipt of a notification from the master node, indicating that processing of one job has been completed. The client requests the master node to process the jobs in such a manner, and therefore the master node can efficiently assign the jobs to the nodes, making it possible to prevent the nodes from experiencing a long waiting period for processing, and thereby to improve processing efficiency of the nodes.

In the subject matter as claimed in claim 3, the client estimates the processing load per job included in the large-scale arithmetic operation, and requests the master node to process the jobs in order from the highest load to the lowest load in accordance with estimation results. Thus, the master node can assign processing of the job with the highest load to a node with the highest processing capability, thereby causing the node to first execute that job, and it is possible to allow the master node to perform the job assignment process, such that the entire processing time can be roughly equalized among all the nodes, thereby making it possible to shorten the entire processing time for the large-scale arithmetic operation.

In the subject matter as claimed in claim 6, the grouping process means groups the jobs constituting the large-scale arithmetic operation, which are memorized in the memory means, based on the grouping rule information memorized in the memory means, thereby forming several job groups. For example, the grouping process means groups 1,000 jobs into 600 job groups. The management means requests the load balancer to process the job groups formed by the grouping process means, such that the load balancer always processes a predetermined number of job groups or less. For example, when the predetermined number is set at 300, the load balancer is always requested to process up to 300 job groups. Accordingly, the load balancer does not have to always manage 1,000 jobs, and is simply required to perform the process of assigning jobs included in 300 job groups or less to the nodes. Therefore it is possible to prevent the load on the load balancer from increasing. Moreover, since the load on the load balancer can be reduced as such, the load balancer can efficiently carry out not only the process for assigning job groups to the nodes, but also the process for meeting the demand to monitor arithmetic results from the information processing device. Furthermore, the number of jobs the load balancer is requested to process is reduced, and therefore the load on the information processing device in terms of the process of monitoring the arithmetic results is reduced.

In the subject matter as claimed in claim 7, the load estimation means estimates the processing load per job group formed by the grouping process means based on the load estimation rule information memorized in the memory means. Based on the processing load estimation result per job group, which is obtained by the load estimation means, the management means requests the load balancer to process the job groups in order from the highest load to the lowest load. Thus, the load balancer can assign processing of the job group with the highest load to a node with the highest processing capability, thereby causing the node to first execute that job group, and it is possible to allow the load balancer to perform the job group assignment process, such that the entire processing time can be roughly equalized among all the nodes, thereby making it possible to shorten the entire processing time for the large-scale arithmetic operation.

BRIEF DESCRIPTION OF DRAWINGS

FIG. 3 is a diagram for describing exemplary jobs constituting a large-scale arithmetic operation;

FIG. 4 is a diagram illustrating an exemplary list generated by a list generation means of the client;

REFERENCE SIGNS OF LIST

Figure 1:
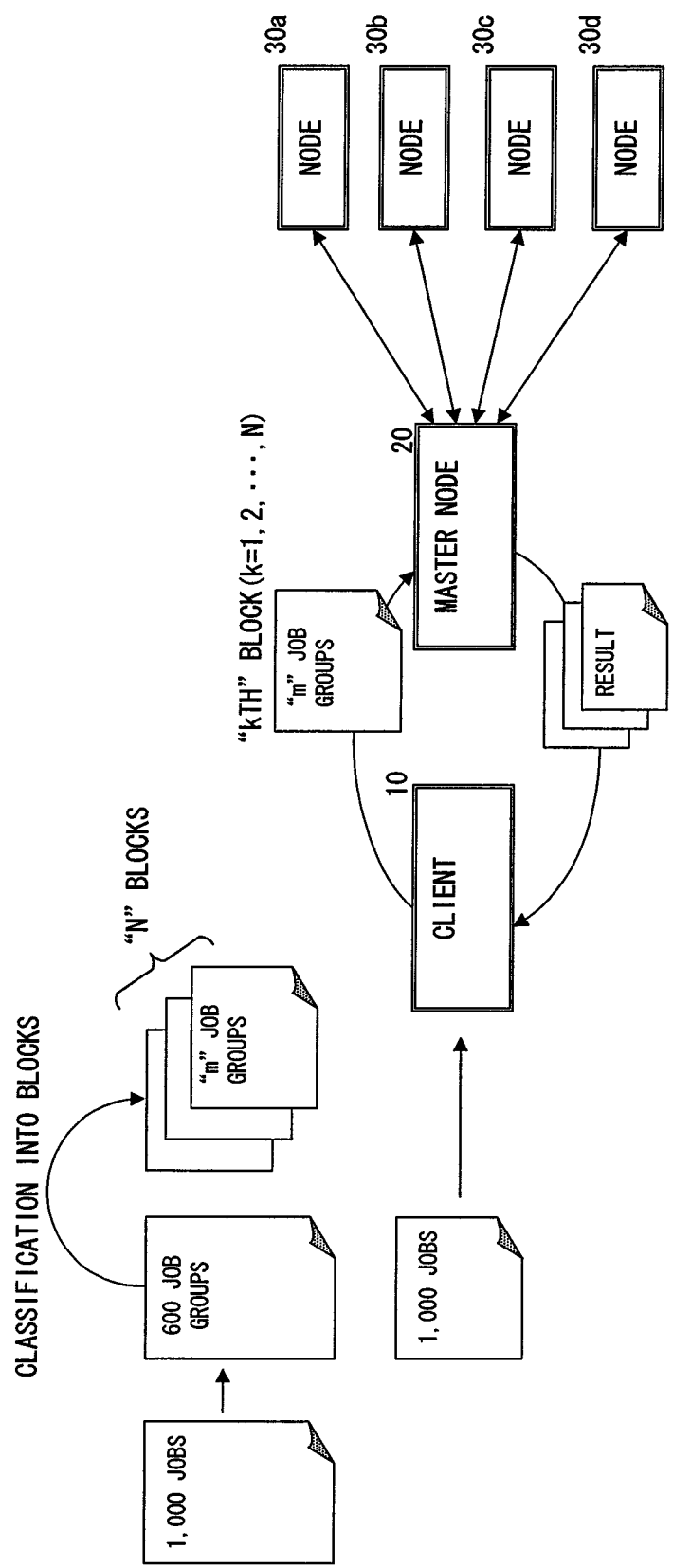
FIG. 1 is a schematic configuration diagram of an information processing system according to an embodiment of the present invention.

10 client
11 input device
12 display device
13 communication portion
14 memory portion
15 control portion
15*a* grouping process means
15*b* load estimation means
15*c* list generation means
15*d* management means
20 master node
30*a*, 30*b*, 30*c*, 30*d* node

BEST MODE FOR CARRYING OUT THE INVENTION

Hereinafter, the best mode for carrying out the present invention related this application will be described with reference to the drawings. FIG. 1 is a schematic configuration diagram of an information processing system according to an embodiment of the present invention.

For example, the information processing system according to the present embodiment is used to share and execute a large-scale arithmetic operation among a plurality of computers. As shown in FIG. 1, the information processing system includes a client 10, a master node 20, and four nodes 30*a*, 30*b*, 30*c*, and 30*d*. Personal computers, workstations, or the like, are used as the client 10, the master node 20, and the nodes 30*a*, 30*b*, 30*c*, and 30*d*. In addition, the client 10, the master node 20, and the nodes 30*a*, 30*b*, 30*c*, and 30*d* are connected together via a network. Here, for example, the internet, or a company network, such as LAN or WAN, is used as the network. Note that the client 10 corresponds to an information processing device according to the subject matter as claimed in claim 6.

The client 10 receives data for the large-scale arithmetic operation, and requests the master node 20 to process the large-scale arithmetic operation. The large-scale arithmetic operation consists of a plurality of jobs. The "job" as used herein refers to a unit of calculation. The data for the large-scale arithmetic operation is typically transmitted from an external computer or the like to the client 10 via the network, but it may be inputted by, for example, a person in charge of the client 10 himself/herself. The data for the large-scale arithmetic operation that is transmitted from the external computer or the like, or inputted by the person in charge, may be already divided or may not be divided into units of jobs when the data is obtained by the client 10. When the client 10 obtains the data for the large-scale arithmetic operation that has not yet been divided into units of jobs, the client 10 divides the data for the large-scale arithmetic operation into a predetermined number of jobs by means of its own job dividing function. Concrete details of the job dividing function will be described later.

In addition, the client 10 performs the process of grouping a plurality of jobs constituting the large-scale arithmetic operation, thereby forming job groups, each consisting of interdependent jobs. In the present embodiment, a request to process the large-scale arithmetic operation is in fact carried out in units of such job groups. Furthermore, the client 10 performs the process of monitoring results of job group processing, which the master node 20 is requested to perform. Concretely, at regular intervals or arbitrary times as the necessity arises, the client 10 inquires of the master node 20 whether the job group processing which the master node 20 has been requested to perform has been completed. In addition, upon receipt of processing results for all the job groups, the client 10 performs the process of consolidating these results. Note that the client 10 having such a function can be implemented by, for example, incorporating software for implementing that function into a workstation.

Incidentally, although the client 10 performs the process of consolidating the processing results for the job groups upon receipt of them, it does not mean that the client 10 always carries out some information processing. In addition, in some cases, an external machine, rather than the client 10, might perform the process of consolidating the processing results for the job groups. Specifically, for example, when 1,000 results are obtained for 1,000 jobs, if the 1,000 results themselves are transmitted to the external machine, the client 10 does not have to perform the consolidation process.

The master node 20 is a computer responsible for the load balancing function, and performs the process of assigning the four nodes 30a, 30b, 30c, and 30d processing of the job groups requested by the client 10. Here, for example, the nodes 30a, 30b, 30c, and 30d are each assigned one job group at a time. The technique as described in the "BACKGROUND ART" section is applicable to the assignment process itself. After determining which job group is to be assigned to which node, the client 10 transmits the details of the job group, i.e., calculation details for jobs included in that job group, and variables for use in the calculation, to the node to which the job group has been assigned. Alternatively, the calculation details for jobs, and the variables for use in the calculation may be stored in a predetermined memory means (not shown), and the client 10 may transmit job group identification information to the node to which the job group has been assigned, along with information indicating locations of both the calculation details for jobs included in the job group, and the variables for use in the calculation. In such a case, the nodes 30a, 30b, 30c, and 30d each access the memory means to obtain the calculation details for jobs included in the job group assigned thereto, and the variables for use in the calculation.

Also, in response to the inquiry from the client 10, for example, the master node 20 transmits a notification to the client 10, indicating that processing of the job group in each of the nodes 30a, 30b, 30c, and 30d has been completed. Here, the master node 20 may transmit such a processing completion notification to the client 10 not only upon inquiry from the client 10 but also upon receipt of a report from any of the nodes 30a, 30b, 30c, and 30d, indicating that job group processing has been completed. Furthermore, upon receipt of a job group processing result from any of the nodes 30a, 30b, 30c, and 30d, the master node 20 transmits that processing result to the client 10. Note that the master node 20 having such a function can be implemented by, for example, incorporating software for implementing that function into a workstation.

The nodes 30a, 30b, 30c, and 30d each execute processing of a job group assigned thereto in response to an instruction from the master node 20. The instruction from the master node 20 includes, for example, the processing details of the job group, and information regarding where to store (or transmit) a processing result. Here, in the present embodiment, the master node 20 is designated as the storage (or transmission) destination of a processing result. Upon completion of the job group arithmetic processing, the nodes 30a, 30b, 30c, and 30d each report to the master node 20 that the processing of the job group has been completed, and transmit the processing result to the master node 20. Thereafter, the nodes 30a, 30b, 30c, and 30d each wait for another instruction to be transmitted. As such, the instruction from the master node 20 to each of the nodes 30a, 30b, 30c, and 30d, and the report from each of the nodes 30a, 30b, 30C, and 30d to the master node 20 are repeatedly carried out to execute the large-scale arithmetic operation. In this case, the master node 20 also effects its load balancing function to perform such a control as to shorten a waiting period between the report from each of the nodes 30a, 30b, 30c, and 30d that the processing of the job group has been completed, and the receipt of another instruction.

Figure 2:
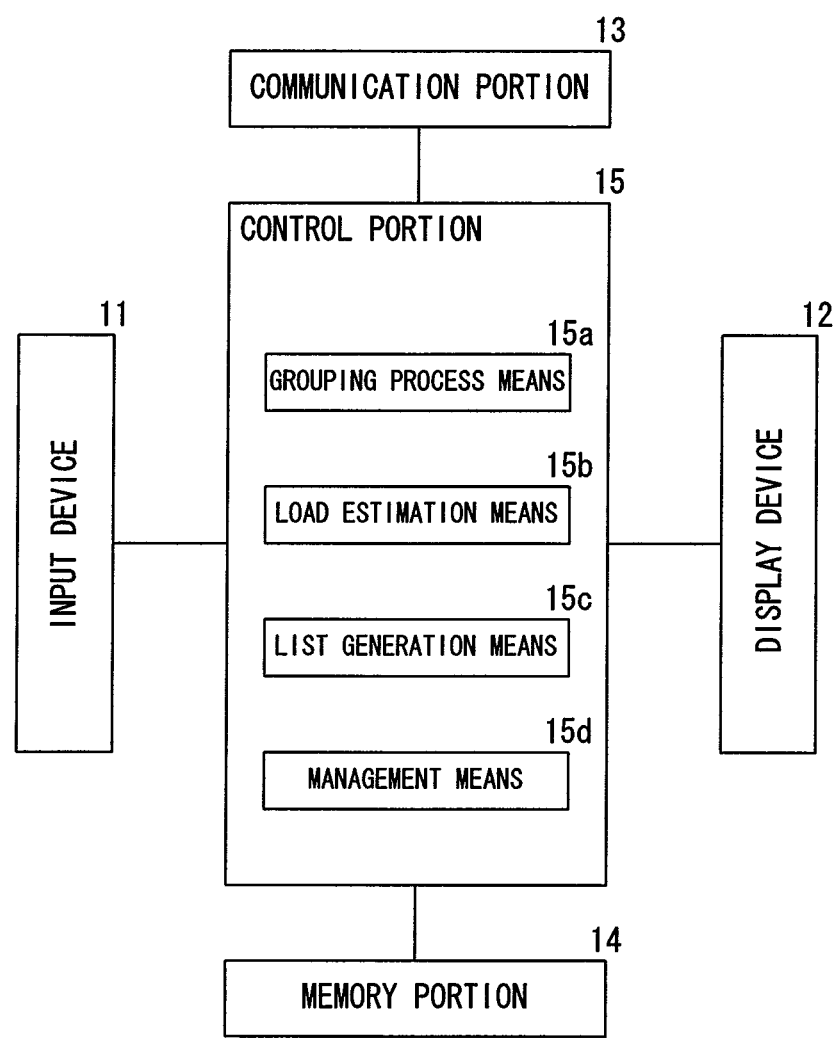
FIG. 2 is a schematic configuration block diagram of a client in the information processing system according to the embodiment.

Next, the configuration of the client 10 will be described in detail. FIG. 2 is a schematic configuration block diagram of the client 10 in the information processing system according to the present embodiment.

As shown in FIG. 2, the client 10 includes an input device 11, a display device 12, a communication portion 13, a memory portion 14, and a control portion 15. For example, the input device 11 inputs various instructions and data for a large-scale arithmetic operation. A keyboard, a mouse, or the like, can be used as the input device 11. In addition, for example, the display device 12 displays an input screen for inputting data for the large-scale arithmetic operation, and it also displays processing results for the large-scale arithmetic operation.

The communication portion 13 transmits information to the master node 20 and other machines (computers, databases, etc.), and also receives information from the master node 20 and other machines. Concretely, the information to be transmitted from other machines to the client 10 includes, for example, data for a large-scale arithmetic operation. In addition, the information to be transmitted from the client 10 to the master node 20 includes, for example, a processing instruction to request processing of job groups, and an inquiry for monitoring processing results. The information to be transmitted from the master node 20 to the client 10 includes, for example, processing results per job group.

The memory portion 14 stores, for example, various application programs and data. For example, a memory device or hard disk drive in the client 10, or an external memory device can be used as the memory portion 14. The memory portion 14 stores data for a large-scale arithmetic operation, grouping rule information, load estimation rule information, a job group list, the maximum number of job groups that can be assigned by the master node 20, processing results per job group, and so on. The grouping rule information, the load estimation rule information, the job group list, and the maximum number of job groups that can be assigned by the master node 20 will be described later.

Here, the large-scale arithmetic operation will be concretely described. Considering now the case where data for a large-scale arithmetic operation is transmitted from an external machine to the client 10 via the network, when the communication portion 13 of the client 10 receives the data for a large-scale arithmetic operation, the data is stored to the memory portion 14. FIG. 3 is a diagram for describing exemplary jobs constituting the large-scale arithmetic operation. In this example, the large-scale arithmetic operation consists of 1,000 jobs. Among them, job "1" is the calculation "$z_1=x+y$", and, for example, it is assumed that there are ten sets of variables (x,y) for that calculation. Job "2" is the calculation "$z=z_1 \times x_1$". That is, the variables for job "2" are the processing result $z_1$ for job 1, and the variable $x_1$. When the variable $x_1$ takes two values, there are twenty sets of variables ($z_1,x_1$). In addition, job "3" is the calculation "$z=x+y_1+y_2$". For this calculation, for example, it is assumed that there are twenty sets of variables ($x,y_1,y_2$). For other jobs also, their respective calculation details and variables are set. The large-scale arithmetic operation consists of such a collection of jobs. Note that in the exemplary large-scale arithmetic operation shown in FIG. 3, although a single job includes a single calculation detail (arithmetic equation), in general, a single job might include a plurality of calculation details. Also, in the exemplary large-scale arithmetic operation shown in FIG. 3, although the jobs differ from each other in the calculation detail (arithmetic equation), there may be a plurality of jobs that have the same calculation detail but different variables, among a plurality of jobs constituting a large-scale arithmetic operation.

Incidentally, in some cases, the client 10 might receive the data for the large-scale arithmetic operation, which has not yet been divided into units of jobs, from an external machine, as described above. Specifically, all calculation details and variables for use therein, which are both included in the data for the large-scale arithmetic operation, might be transmitted in an undivided state from the external machine to the client 10, for example, without being divided into 1,000 jobs in total from job "1" to job "1,000", as shown in FIG. 3. In such a case, the client 10 effects its job dividing function provided thereto to divide the transmitted data for the large-scale arithmetic operation on a calculation-by-calculation basis, and combine each calculation obtained by division with variables for use therein, thereby obtaining data for the large-scale arithmetic operation that has been divided into units of jobs. In addition, the data for a large-scale arithmetic operation might not be directly transmitted from the external machine to the client 10, but stored in an external database. In such a case, the client 10 receives in advance from the external machine only location information about the external database, and data for a division criterion by which to determine how to divide the data for a large-scale arithmetic operation. Thereafter, the client 10 effects the job dividing function to access the external database, and divide the data for a large-scale arithmetic operation into a plurality of jobs in accordance with the division criterion, thereby obtaining data for the large-scale arithmetic operation that has been divided into units of jobs.

The control portion 15 performs overall control of each portion of the client 10. As shown in FIG. 2, the control portion 15 includes a grouping process means 15a, a load estimation means 15b, a list generation means 15c, and a management means 15d.

The grouping process means 15a performs a grouping process for grouping a plurality of jobs constituting the large-scale arithmetic operation, thereby forming job groups, each consisting of interdependent jobs. When one job is related to or depends on another job, in some cases, it might be inappropriate to process these jobs individually. For example, when the processing result for job "1" is used to perform the calculation for job "2" as shown in FIG. 3, if the master node 20 is requested to process job "2" before being requested to process job "1", job "2" cannot be processed. Therefore, the grouping process means 15a reads grouping rule information stored in the memory portion 14, and performs the grouping process to group a plurality of jobs constituting the large-scale arithmetic operation in accordance with the grouping rule information that has been read, thereby forming several job groups. The grouping rule information has been previously stored in the memory portion 14 for each large-scale arithmetic operation to be performed. Also, in some cases, the grouping rule information might be transmitted from the external machine, along with the data for the large-scale arithmetic operation, and then stored to the memory portion 14. For example, in the case of grouping rule information regarding a large-scale arithmetic operation for calculating trajectories of objects, it is possible to set a rule of forming job groups, such that each group consists of jobs having calculation targets in common in terms of scientific and physical characteristics of the objects. Also, in the case of grouping rule information regarding a large-scale arithmetic operation for making production schedules for products at a factory or the like, it is possible to set a rule of forming job groups, such that each group consists of jobs having calculation targets in common in terms of product type and size. In addition, in the case of the grouping rule information regarding the large-scale arithmetic operation shown in FIG. 3, it is possible to set a rule of forming job groups, such that each group consists of jobs that are correlated in terms of use of variables. When this rule information is applied to the example of FIG. 3, the grouping process means 15a analyzes the correlation between jobs in terms of use of variables, and forms one job group by grouping jobs "1" and "2". Furthermore, the grouping rule information may define a rule regarding the maximum number of jobs that can be included in one job group, such that each group is formed by grouping a plurality of jobs, the number of which is determined so as not to exceed the maximum number. In addition, it is possible to set a rule by combining a plurality of rules as described above. For example, in the case of the grouping rule information regarding the large-scale arithmetic operation for making production schedules for products at a factory or the like, it is possible to set a rule of forming job groups, such that each group consists of jobs having calculation targets in common in terms of product type and size, and the number of jobs included therein does not exceed a predetermined maximum number. Concretely, in the present embodiment, the grouping process means 15a performs the grouping process for 1,000 jobs as shown in FIG. 3, and obtains 600 job groups as shown in FIG. 1.

For each job group obtained by the grouping process means 15a, the load estimation means 15b estimates a processing load in accordance with load estimation rule information stored in the memory portion 14. For example, the load estimation rule information defines a rule of estimating a processing load per job group, such that the processing load is estimated based on the sum of sets of variables for jobs included in the job group. The sum of sets of variables is the total number of times calculation is carried out for the jobs included in the job group during arithmetic processing of the job group. Accordingly, if each job has roughly the same level of calculation detail, it is conceivable that the processing load for the job group increases as the sum of sets of variables increases. Note that if the jobs differ from each other in the calculation detail significantly, the loads for the jobs are different accordingly. In such a case, to correctly estimate the load, the details of the load estimation rule information may be changed considering the details of the jobs, as well as the number of sets of variables. To carry out such a load estimation considering the details of the jobs, for example, it is necessary to externally provide parameters indicating the level of calculation detail for the job, or store previously-used parameters to the memory portion 14, which are read again at a later use.

Note that as a result of the estimation by the load estimation means 15b, if any job group with an extremely high load has been found, the load estimation means 15b may return the job group to the grouping process means 15a, thereby causing the grouping process means 15a to perform the process of further dividing the job group into smaller groups. In such a case, the grouping rule information is required to contain load threshold information by which to determine whether to further divide the job group into smaller groups, as well as a rule for that further division. It is not possible to classify, in particular, interdependent jobs into different groups, and therefore the grouping rule information is required to contain a rule for such indivisible jobs. In general, the rule contained in the grouping rule information can be defined in various formats, such as those of the "if-then" rule and the range specification rule.

The list generation means 15c generates a job group list based on the processing load per job group estimated by the load estimation means 15b, such that the job groups are sorted in descending order of load, and the generated list is stored to the memory portion 14. FIG. 4 illustrates an example of the list generated by the list generation means 15c. This list includes "job group ID" fields, and "target job" fields. Each "job group ID" field indicates an ID number (identification information) assigned to the job group, and each "target job" field indicates the job number of each job included in the job group. The list in FIG. 4 is directed to 600 job groups obtained from the 1,000 jobs shown in FIG. 3. The job group with the highest load is indicated at the top of the list, and the loads put on by the job groups are lower as the list goes down. In this example, the job group with ID No. "001", which consists only of job "1000", exhibits the highest load, and the job group with ID No. "002", which consists of jobs "5", "6", and "7", exhibits the second highest load. As such, in the example of FIG. 4, the list generation means 15c assigns ID numbers to the 600 job groups in descending order of load. Therefore, the job group ID numbers play not only the role of identifying the job groups, but also the role of indicating the descending order of load. The list also includes a "request completed" field and a "receipt completed" field for each job group. Each "request completed" field is intended to be assigned a "request completed" flag, which indicates that the master node 20 has been requested to process the job group. Each "receipt completed" field is intended to be assigned a "receipt completed" flag, which indicates receipt of a notification that processing of the job group has been completed. In the present embodiment, concretely, the "request completed" field and the "receipt completed" field are each assigned the flag "0" when the processing has not been "completed", and the flag "1" when the processing has been "completed". Note that the "request completed" flag and the "receipt completed" flag are managed by the management means 15d.

The management means 15d requests the master node 20 to process each job group included in the large-scale arithmetic operation. Concretely, the management means 15d classifies a plurality of job groups constituting the large-scale arithmetic operation into several blocks, and requests the master node 20 to process the job groups block by block, such that the master node 20 always assigns a predetermined number of job groups or less. Here, the number of job groups to be included in each block is suitably determined within the range between 1 and the predetermined number. Specifically, if the predetermined number (i.e., the maximum number of job groups to be assigned by the master node 20) is M, a single block contains m job groups, where m is a natural number from 1 to M, inclusively. In addition, the maximum number M of job groups to be assigned by the master node 20 is preferably determined in such a manner as to allow the master node 20 to efficiently assign the job groups to the nodes, even if the number of nodes is significant. Specifically, the maximum number M of job groups to be assigned by the master node 20 is determined in accordance with the processing capability of the master node 20. In the present embodiment, the maximum number M of job groups to be assigned by the master node 20 is set at 300, for example. Here, the maximum number M of job groups to be assigned by the master node 20 is stored in the memory portion 14.

In addition, the management means 15d preferably requests the master node 20 to process the job groups in order from the highest load to the lowest load in accordance with the list shown in FIG. 4. If the master node 20 is requested at the last to process the job group with the highest load, the job group is processed by one node over a long period of time, resulting in an extremely long processing time for the entire large-scale arithmetic operation. By requesting the master node 20 to process the job groups in descending order of load, the master node 20 can assign processing of the job group with the highest load to a node with the highest processing capability, thereby causing the node to first execute that job group, and it becomes possible to allow the master node 20 to perform the job group assignment process, such that the entire processing time can be roughly equalized among all the nodes, thereby making it possible to shorten the entire processing time for the large-scale arithmetic operation.

Incidentally, there are various possible methods for the management means 15d to request the master node 20 to process the job groups. In the present embodiment, the following two requesting methods will be described as typical examples.

In the first requesting method, of the 600 job groups constituting the large-scale arithmetic operation as shown in FIG. 4, 300 job groups listed in the top three hundred in FIG. 4 are classified into the first block, and other job groups are each classified as the nth block (where n=2, 3, . . . , N) in order from the highest position on the list of FIG. 4. Here, N=301. Therefore, the 300 job groups from ID No. "001" to ID No. "300" belong to the first block, the job group with ID No. "301" belongs to the second block, the job group with ID No. "302" belongs to the third block, . . . , and the job group with ID No. "600" belongs to the 301st block. The management means 15d first requests the master node 20 to process the 300 job groups in the first block, and thereafter upon each receipt of a notification from the master node 20, indicating that processing of one job group has been completed, the management means 15d requests the master node 20 to process a predetermined one of the blocks for which processing has not yet been requested. Here, the request to process the one predetermined block is made for the block listed in the highest position in FIG. 4, excluding any block for which the processing request has already been made at that time. For example, in the case where the master node 20 has already been requested so as to process a total of 100 blocks, from the first to the 100th block, when the management means 15d receives a notification that processing of one job group has been completed, the master node 20 is requested to process the 101st block.

In addition, in the second requesting method, of the 600 job groups constituting the large-scale arithmetic operation, 300 job groups listed in the top three hundred in FIG. 4 are classified into the first block, and the next 300 job groups on the list, i.e., the 301st to 600th job groups, are classified into the second block. The management means 15d first requests the master node 20 to process the 300 job groups in the first block, and then the 300 job groups in the second block after processing of all the requested 300 job groups in the first block has been completed.

With the first requesting method, the master node 20 can efficiently assign the job groups to the nodes 30a, 30b, 30c, and 30d, making it possible to prevent the nodes 30a, 30b, 30c, and 30d from experiencing a long waiting period for processing, and thereby to improve processing efficiency of the nodes 30a, 30b, 30c, and 30d. On the other hand, with the second requesting method also, it is possible to improve the processing efficiency of the nodes 30a, 30b, 30c, and 30d. However, in the case of the second requesting method, after the processing of the first block has been completed, the nodes 30a, 30b, 30c, and 30d might experience a slight waiting period for processing before the processing of the second block is started. Therefore, in consideration of this, it is conceivable that the first requesting method is superior to the second requesting method in the processing efficiency of each node.

As such, in the present embodiment, the management means 15d classifies the 600 job groups constituting the large-scale arithmetic operation into several blocks, and requests the master node 20 to process the job groups block by block, such that the master node 20 can always perform the assignment process for 300 job groups or less. Therefore, hypothetically, the master node 20 performs the process of assigning the nodes up to 300 job groups, the number of which is relatively small as compared to that in the conventional art, and therefore it is possible to prevent the load on the master node 20 from increasing. Specifically, in the present embodiment, the client 10 (the management means 15d) functions to control the load on the master node 20, so that the master node 20 and the client 10 are as a whole free from the state of high load.

In addition, the management means 15d uses the list generated by the list generation means 15c to manage the processing request status per job group. Specifically, after requesting the master node 20 to process a job group, the management means 15d sets the "request completed" flag "1" in the "request completed" field for that job group on the list of FIG. 4. In addition, at regular intervals or arbitrary times as the necessity arises, the management means 15d inquires of the master node 20 whether any job group, which the master node 20 has been requested to process, has been completely processed, and upon receipt of a notification from the master node 20, indicating that the job group has been completely processed, the management means 15d sets the "receipt completed" flag "1" in the "receipt completed" field for that job group on the list of FIG. 4. Thus, for each job group, the management means 15d can judge whether the "request completed" flag "1" is set on the list, thereby determining whether the master node 20 has been requested to process the job group, while the management means 15d can judge whether the "receipt completed" flag "1" is set on the list, thereby determining whether processing of the job group has been completed.

Described next is the procedure of processing the large-scale arithmetic operation in the information processing system according to the present embodiment.

Figure 5:
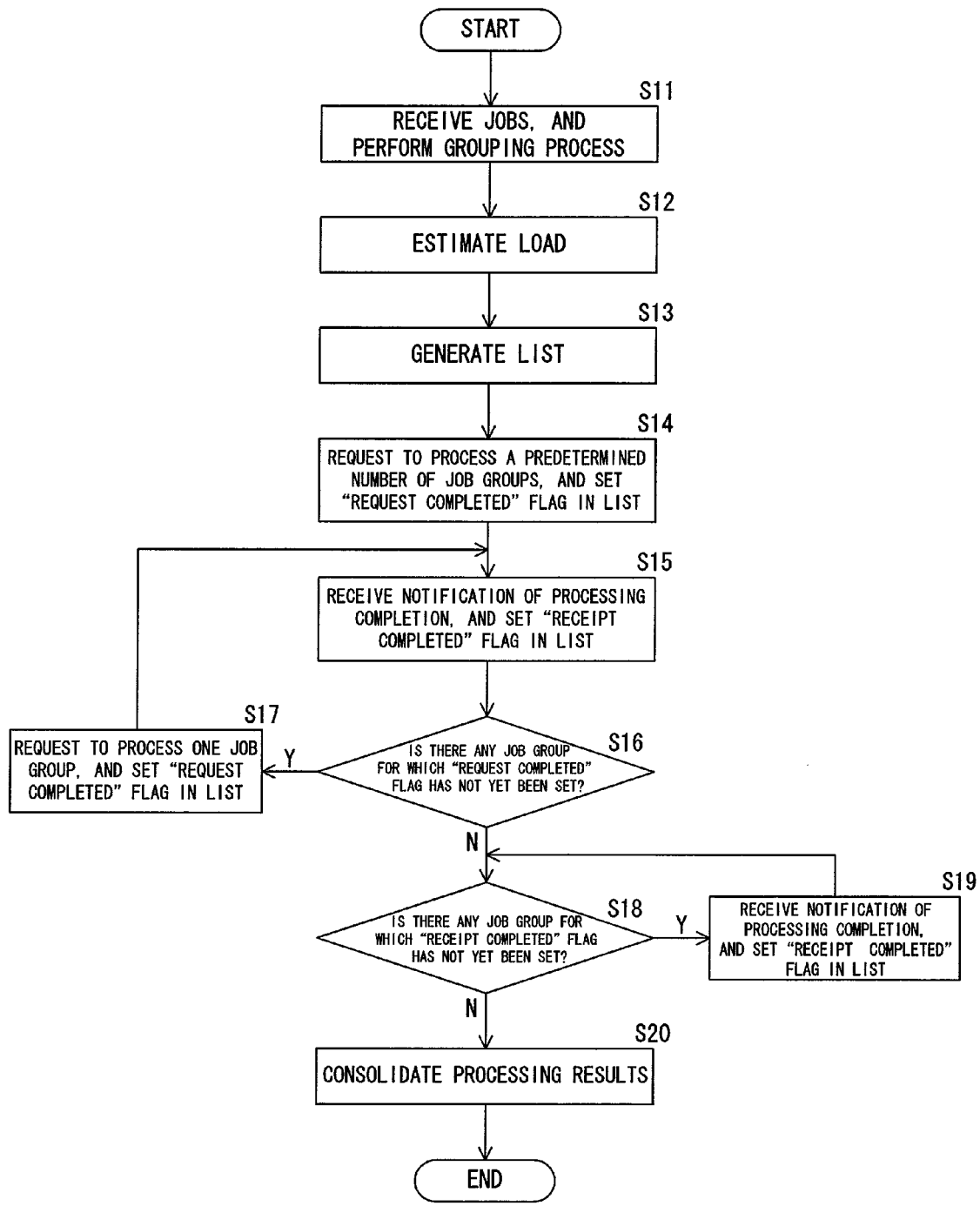
FIG. 5 is a flowchart for describing the procedure by which the client carries out processing in accordance with a first requesting method.

The procedure of processing the large-scale arithmetic operation in the information processing system according to the present embodiment will be first described with respect to the case where the client 10 carries out processing in accordance with the first requesting method. FIG. 5 is a flowchart for describing the procedure by which the client 10 carries out the processing in accordance with the first requesting method.

First, for example, data for a large-scale arithmetic operation is transmitted to the client 10 via the network. Here, it is assumed that the large-scale arithmetic operation consists of 1,000 jobs as shown in FIG. 3. Upon receipt of the data for the large-scale arithmetic operation, the client 10 performs a grouping process on the 1,000 jobs constituting the large-scale arithmetic operation, such that interdependent jobs are classified into one job group (S11). Here, it is assumed that 600 job groups are obtained through the grouping process performed by the client 10 as shown in FIG. 1.

Next, the client 10 estimates the processing load per job group (S12). For example, the load estimation is carried out based on the sum of sets of variables for all the jobs included in the job group. In this case, the client 10 determines the job group to exhibit a higher processing load as the sum of sets of variables increases.

Next, the client 10 generates a job group list, in which the 600 job groups are sorted in descending order of load, based on the processing load per job group obtained by the processing in step S12 (S13). Here, it is assumed that the list as shown in FIG. 4 is generated.

Next, the client 10 classifies the 600 job groups into 301 blocks. Concretely, the top 300 job groups on the list of FIG. 4, i.e., the job groups from ID No. "001" to ID No. "300", are classified into the first block, and other job groups are sequentially classified into the second block, the third block, ..., and the 301st block, in descending order of load on the list of FIG. 4. Here, the first block contains 300 job groups, and the nth block (n=2, 3, ..., 301) contains only one job group. In this manner, a total of 301 blocks are obtained. Thereafter, the client 10 first requests the master node 20 to process the 300 job groups in the first block (S14). After requesting the master node 20 to process the job groups, the client 10 sets the "request completed" flag "1" in the "request completed" field for each of the job groups on the list.

Upon request by the client 10 to process the 300 job groups, the master node 20 assigns processing of these job groups to the nodes 30a, 30b, 30c, and 30d. The nodes 30a, 30b, 30c, and 30d each execute processing of the job group assigned thereto. Upon completion of the job group processing, the nodes 30a, 30b, 30c, and 30d each transmit a report thereof and a processing result to the master node 20.

On the other hand, after requesting the master node 20 to process the job groups, the client 10 inquires of the master node 20 whether any job group, which the master node 20 has been requested to process, has been completely processed, at regular intervals or arbitrary times as the necessity arises. Upon receipt of the inquiry, if there is any job group that has already been processed, the master node 20 transmits to the client 10 a notification indicating that the job group has already been processed, along with the processing result. Thereafter, upon receipt of the notification indicating that the job group has already been processed, the client 10 sets the "receipt completed" flag "1" in the "receipt completed" field for that job group on the list (S15).

After the processing in step S15, the client 10 determines whether there is any job group for which the "request completed" flag "1" has not yet been set on the list (S16). If there is any job group for which the "request completed" flag "1" has not yet been set, the client 10 requests the master node 20 to process the job group listed at the highest position in FIG. 4, excluding the job groups for which processing has already been requested so far (S17). In addition, the client 10 sets the "request completed" flag "1" in the "request completed" field for that job group on the list. Thereafter, the procedure advances to step S15. The processing in steps S15, S16, and S17 will be repeated as long as the client 10 determines in step S16 that there is any job group for which the "request completed" flag "1" has not yet been set. Here, so long as there is any job group for which the "request completed" flag "1" has not yet been set, the number of job groups the master node 20 has been requested to process is always 300. Specifically, so long as there is any job group for which the "request completed" flag "1" has not yet been set, the master node 20 always assigns processing of 300 job groups to the nodes 30a, 30b, 30c, and 30d.

Upon receipt of a notification that a job group has been processed after the processing in steps S15, S16, and S17 is repeated 300 times (S15), the client 10 determines that there is no job group for which the "request completed" flag "1" has not yet been set on the list (S16). That is, at this time, the master node 20 has been requested to process all of the 600 job groups. Next, the client 10 determines whether there is any job group for which the "receipt completed" flag "1" has not yet been set on the list (S18). If there is any job group for which the "receipt completed" flag "1" has not yet been set, the procedure advances to step S19. In step S19, upon receipt of a notification that a job group has been processed, the client 10 sets the "receipt completed" flag "1" in the "receipt completion" field for that job group on the list. Thereafter, the procedure returns to step S18. The processing in steps S18 and S19 will be repeated as long as the client 10 determines in step S18 that there is any job group for which the "receipt completed" flag "1" has not yet been set. At this time, upon each processing in step S19, the number of job groups the master node 20 has been requested to process is decremented by 1. Accordingly, after the "request completed" flag "1" has been set for all the job groups on the list, the master node 20 always assigns processing of 300 job groups or less to the nodes 30a, 30b, 30c, and 30d.

After the processing in steps S18 and step S19 is repeated 300 times, the client 10 determines that there is no job group for which the "receipt completed" flag "1" has not yet been set on the list (S18). Accordingly, the client 10 confirms that the large-scale arithmetic operation has been completely processed, and consolidates the processing results (S20). Thus, the flow of processing by the client 10 as shown in FIG. 5 ends.

Figure 6:
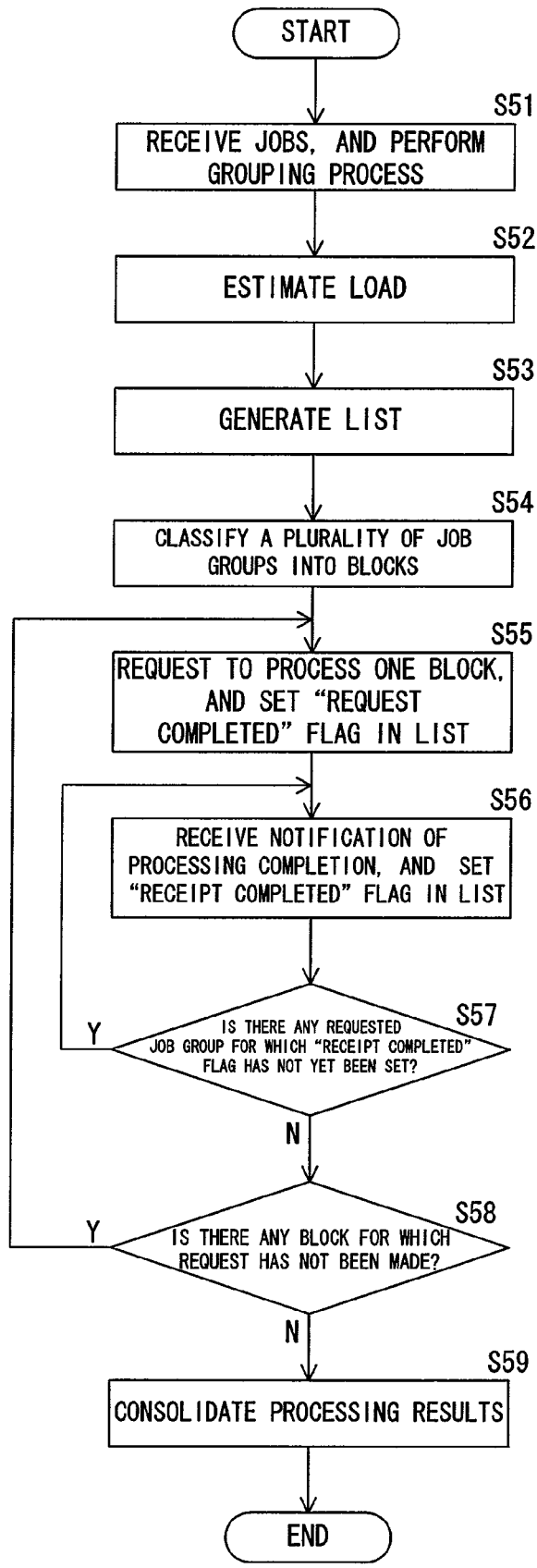
FIG. 6 is a flowchart for describing the procedure by which the client carries out processing in accordance with a second requesting method.
Figure 7:
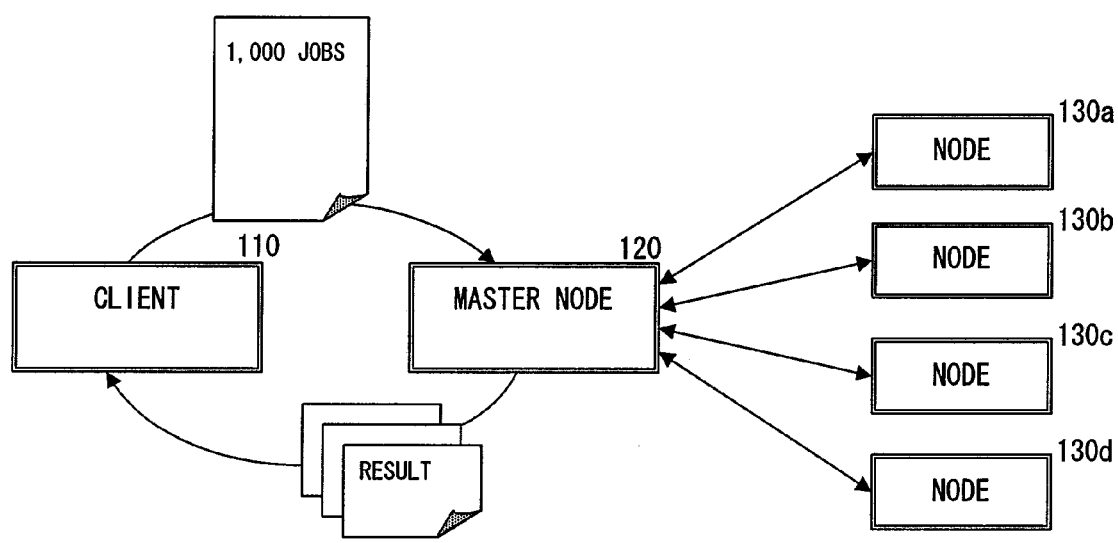
FIG. 7 is a schematic configuration diagram of a conventional information processing system constructed based on the grid computing technique.

Next, the procedure of processing the large-scale arithmetic operation in the information processing system according to the present embodiment will be described with respect to the case where the client 10 carries out the processing in accordance with the second requesting method. FIG. 6 is a flowchart for describing the procedure by which the client 10 carries out the processing in accordance with the second requesting method.

Processing details of steps S51, S52, and S53 in the process flow of FIG. 6 are the same as those of steps S11, S12, and S13, respectively, in the process flow of FIG. 5, and therefore descriptions thereof will be omitted herein.

After the processing in step S53, the client 10 classifies the 600 job groups into two blocks (S54). Concretely, the top 300 job groups on the list of FIG. 4 are classified into the first block, and the next 300 job groups on the list, i.e., the 301st to 600th job groups, are classified into the second block.

Next, the client 10 requests the master node 20 to process one block (S55). Here, the master node is first requested to process the first block, and then the second block. Accordingly, in this case, the master node 20 is first requested to process the 300 job groups in the first block. In addition, when the master node 20 is requested to process the job groups, the client 10 sets the "request completed" flag "1" in the "request completed" field for each of the job groups on the list.

Thereafter, at regular intervals or arbitrary times as the necessity arises, the client 10 inquires of the master node 20 whether any job group, which the master node 20 has been requested to process, has been completely processed. Upon receipt of a notification from the master node 20, which responds to the inquiry, indicating that a job group has already been processed, the client 10 sets the "receipt completed" flag "1" in the "receipt completed" field for that job group on the list (S56).

Next, the client 10 determines whether there is any job group for which the "request completed" flag "1" has already been set on the list but the "receipt completed" flag "1" has not yet been set (S57). If there is any job group for which the "receipt completed" flag "1" has not yet been set, the procedure returns to step S56. The processing in steps S56 and S57 is repeated unless processing of all the currently requested 300 job groups is determined to have been completed.

After the processing in steps S56 and S57 is repeated 299 times, when the client 10 receives a notification that the job group has been completely processed (S56), the client 10 determines that the "receipt completed" flag "1" has been set for all the job groups for which the "request completed" flag "1" has been set on the list (S57). That is, at this time, all the 300 job groups in the first block have been completely processed. Next, the client 10 determines whether there is any block the master node 20 has not yet been requested to process, based on the "request completed" flag "1" on the list (S58). In this case, the master node 20 has not yet been requested to process the job groups included in the second block, and the "request completed" flag "1" has not yet been set for these job groups. Therefore, the determination in step S58 is affirmative. When the determination in step S58 is affirmative, the procedure returns to step S55. In step S55, the master node 20 is requested to process the 300 job groups in the second block.

After the 300 job groups in the second block have been completely processed (S57), so that there is no block the master node 20 has not yet been requested to process (S58), the client 10 confirms that processing of the large-scale arithmetic operation has been completed, and consolidates the processing results (S59). Thus, the flow of processing by the client 10 as shown in FIG. 6 ends.

In the information processing system according to the present embodiment, the client forms several job groups by grouping a plurality of jobs constituting the large-scale arithmetic operation, and thereafter the client further classifies the job groups into blocks, and requests the master node to process the job groups block by block, such that the master node always assigns a predetermined number of job groups or less. Thus, the client can gradually request the master node to process a plurality of job groups block by block, rather than simultaneously requesting the master node to process all jobs as in the conventional art. Such a client conceivably has the function of controlling the load on the master node. Accordingly, the master node is simply required to always perform the process of assigning the nodes only the jobs included in a predetermined number of job groups as described above, and therefore it is possible to prevent the load on the master node from increasing. Moreover, the load on the master node can be reduced in such a manner, and therefore the master node can efficiently perform not only the process for assigning the job groups to the nodes, but also the process for meeting the client's demand to monitor arithmetic results. Furthermore, the number of jobs the client requests the master node to process is reduced, and therefore the load on the client in terms of the process of monitoring the arithmetic results is reduced.

Note that the present invention is not limited by the above embodiment, and various modifications can be made within the scope of the invention.

The above embodiment has been described with respect to the case where the master node instructs the nodes to store the processing results to the master node, so that each node transmits the processing results for the job groups to the master node, which in turn transmits the processing results to the client. However, the master node may instruct the nodes to store the processing results to, for example, a predetermined database. In such a case, every time each node completes arithmetic processing of a job group, the node reports to the master node that processing of the job group has been completed, and stores the processing result to the instructed database. Upon receipt of a notification from the master node, indicating processing of the job group has been completed, the client accesses the database to obtain the processing result for that job group.

In addition, the above embodiment has been described with respect to the case where the client estimates a processing load per job group, and requests the master node to process the job groups in order from the highest load to the lowest load, in accordance with estimation results. However, the client does not have to estimate the processing load per job group, and request the master node to process the job groups in descending order of load. That is, the client may request the master node to process the job groups in an arbitrary order.

Furthermore, the above embodiment has been described with respect to the case where the client carries out the grouping process for forming groups, each consisting of interdependent jobs. However, for example, when using jobs that are not interdependent, the client does not have to perform the grouping process on the jobs. In addition, a basic unit of calculation that is independent from arithmetic results for other basic units may be defined as the "job". In such cases, the job and the job group can be naturally considered to be identical. Note that when using jobs that are not interdependent, information regarding the maximum number of jobs that can be included in a single job group may be used as the grouping rule information, so that the grouping process means can classify a plurality of jobs into several job groups, based on the information regarding the maximum number.

In addition, the above embodiment has been described with respect to the case where a single client requests a single master node to process jobs (or job groups). However, for example, it is conceivable that a plurality of clients simultaneously request a single master node to process jobs (or job groups). In such a case, the clients may preferably be provided with the function of achieving cooperation between the clients, along with the function characteristic of the present invention, i.e., the function of making a request to process jobs (or job groups) block by block. As a result, the clients cooperate with each other to make adjustments, such that the total number of jobs (or job groups) the master node is requested to process is always within a predetermined range. As a method that achieves such a cooperative function, it is possible to use a method in which the clients communicate with each other to mutually notify themselves of information regarding the number of jobs (or job groups) the master node has been currently requested to process. In addition, another method can be used, in which the master node, or another machine that is neither a client nor a master node, is provided with a job number management means for managing the number of jobs (or job groups) the master node has been currently requested to process. Concretely, the job number management means has information regarding the maximum number of jobs (or job groups) the master node can accept a request to process. When requesting the master node to process jobs (or job groups), each client transmits, to the job number management means, information regarding the number of jobs (or job groups) for which a request is to be made. When the information regarding the number of jobs (or job groups) is sent from each client, and the job number management means accepts the request to process the jobs (or job groups), the job number management means determines whether the total number of jobs (or job groups) the master node has been requested to process exceeds the maximum number. If the total number is determined not to exceed the maximum number, the job number management means transmits to the client an instruction to accept the request to process the jobs (or job groups). On the other hand, if the total number is determined to exceed the maximum number, the job number management means transmits to the client an instruction to hold or cancel the request to process the jobs (or job groups). Thus, even if a plurality of clients request a single master node to process jobs, it is possible to reduce the processing load on the master node.

Conversely, the present invention is applicable to the case where a single client requests a plurality of master nodes to process jobs (or job groups). Such a job (or job group) request form is suitable when the number of jobs (or job groups) requested by the client is significant, or when the jobs (or job groups) exhibit an extremely high load. The procedure for processing in this case is roughly the same as in the above embodiment. However, there is a possibility where a plurality of master nodes might not have a standardized load balancing function, e.g., they might have their respective load balancing functions implemented by different vendor products. In such a case, conceivably, it is necessary to make adjustments of, for example, the process by which to pass jobs (or job groups) from the client to the master nodes, and the process by which to consolidate job processing results obtained by nodes. For example, calculation details of jobs, variables therefor, and the job processing results obtained by the nodes may be passed between the client, the master nodes and the nodes via an external common database, rather than being directly transmitted to/received from the client, the master nodes, or the nodes, so that the client can eventually collect the processing results from the external database and carry out the consolidating process. Note that as can be appreciated from the foregoing, the present invention is also applicable to the case where a plurality of clients request a plurality of master nodes to process jobs (or job groups).

Furthermore, the above embodiment has been described with respect to the case where the client classifies a plurality of jobs (or job groups) constituting the large-scale arithmetic operation into several blocks, and requests the master node to process the jobs (or job groups) block by block, such that the master node can always perform the process of assigning a predetermined number of jobs (or job groups) or less. However, for example, the client may simultaneously request the master node to process all jobs (or job groups) as in the conventional art, so that the master node classifies the jobs (or job groups) into several blocks, and carries out the process of assigning the jobs (or job groups) block by block. That is, the function characteristic of the present invention may be provided to the master node, rather than to the client. As a result, for example, even if the client requests the master node to process 1,000 jobs, it is possible to always limit the number of jobs that are to be assigned to the nodes within a predetermined range (e.g., 300 jobs or less), thereby making it possible to satisfactorily reduce the processing load on the master node. Specifically, in the case of the conventional information processing systems, for example, when the master node is requested to process 1,000 jobs, the master node is always required to manage all the 1,000 jobs as targets of the load balancing function. However, the information processing system according to the present invention makes it possible to keep the number of jobs the master node is always required to manage, for example, within 300. In this case, however, the client simultaneously requests the master node to process all the jobs as in the conventional art, and therefore the client might experience an unnecessary processing waiting period, resulting in a slight reduction in processing efficiency in the client as compared to the processing efficiency attained in the above embodiment. However, the processing load on the entire information processing system can be reduced.

In addition, the above embodiment has been described with respect to the case where the client and the master node are each implemented by a workstation or the like. However, for example, the client and the master node may be implemented by one workstation or the like. Specifically, software for implementing the functions of both the client and the master node may be incorporated into one workstation, or the workstation may additionally have the function of a node. Note that the above embodiment has been described with respect to the case where a workstation consistently serves as the client or the master node, and a workstation has the functions of both the client and the master node, but the present invention is not limited thereto. Specifically, by installing into a plurality of workstations such software as to allow the workstations to function as the client, the master node, and the node, it becomes possible to flexibly operate each workstation as the client on one occasion, or as the master node or the node on another occasion.

It is understood that the objective of the present invention is also achieved by providing a device according to the present embodiment with program codes (including executable codes) of software for implementing functions of the device according to the above embodiment via a recording medium having the program codes entirely or partially recorded thereon, in which the device includes a computer (or a CPU or MPU) that reads the program codes stored in the recording medium to execute all or part of the operation. In this case, the program codes read from the recording medium by themselves implement the functions in the present embodiment, and the recording medium having the program codes recorded thereon constitutes one aspect of the present invention.

Examples of the recording medium for supplying the program codes include a ROM, a floppy (registered trademark) disk, a hard disk, an optical disk, a magneto-optical disk, a CD-ROM, a CD-R, a DVD-ROM, a magnetic tape, and a nonvolatile memory card. Furthermore, the program codes may be supplied through downloading via a communication line, or may be supplied and executed by means of JAVA (registered trademark) technology or the like.

In addition, it is understood that the present invention encompasses not only the case where the functions in the present embodiment are implemented by executing the program codes read by a computer, but also the case where an OS or the like that is operating on a computer performs part or all of the actual processing in accordance with instructions by the program codes, such that the functions in the present embodiment are implemented by such processing.

Furthermore, it is understood that the present invention also encompasses the case where the program codes read from a recording medium are written to a memory included in a function extension board inserted into a computer or a memory included in a function extension unit connected to a computer, and thereafter a CPU or the like provided in the function extension board or the function extension unit performs part or all of the actual processing in accordance with instructions by the program codes, so that the functions in the present embodiment are implemented by such processing.

In addition, the present invention may be a program product including a program causing a computer to implement the functions of the device according to the above embodiment. Here, the program product refers not only to a computer program, but also to a recording medium or a computer, which has the program recorded thereon.

INDUSTRIAL APPLICABILITY

In the information processing system of the present invention, as described above, the client classifies a plurality of jobs constituting a large-scale arithmetic operation into several blocks, and requests the master node to process the jobs block by block, such that the master node can always perform the process of assigning a predetermined number of jobs or less. Thus, the client can request the master node to process a plurality of jobs little by little in units of blocks into which the jobs are classified such that each block consists of small-scale jobs, rather than simultaneously requesting the master node to carry out processing of all the jobs as in the conventional art. Such a client conceivably has the function of controlling the load on the master node. Thus, the master node is simply required to always perform the process of assigning the predetermined number of jobs or less to the nodes, and therefore it is possible to prevent the load on the master node from increasing. Moreover, since the load on the master node can be reduced as such, the master node can efficiently perform not only the process for assigning jobs to the nodes, but also the process for meeting the client's demand to monitor arithmetic results. Furthermore, the number of jobs the client requests the master node to process is reduced, and therefore the load on the client in terms of the process of monitoring the arithmetic results is reduced. Thus, the present invention is applicable to the information processing system in which a plurality of computers connected via a network share and execute processing of a large-scale arithmetic operation consisting of a plurality of jobs.

The invention claimed is:

1. An information processing system, comprising:
a client for requesting processing of a large-scale arithmetic operation consisting of a plurality of jobs,
a plurality of nodes for executing processing of the jobs, and
a master node for assigning processing of the jobs, requested by the client, to the nodes, wherein
the client, the nodes, and the master node together via a network, and
the client classifies the jobs constituting the large-scale arithmetic operation, which are stored in a memory, into several blocks, and requests the master node to process the jobs block-by-block, such that the master node always assigns a predetermined number of jobs or less to the nodes.

2. The information processing system according to claim 1, wherein the client classifies the jobs constituting the large-scale arithmetic operation, such that a predetermined number of jobs belong to a first block, and other jobs each belong to an nth block, where n=2, 3, ..., N, and the client first requests the master node to process the predetermined number of jobs in the first block, and then requests the master node to process a predetermined one of the blocks that have not yet been processed upon each receipt of a notification from the master node, indicating that processing of one job has been completed.

3. The information processing system according to claim 1, wherein the client estimates a processing load per job included in the large-scale arithmetic operation, and requests the master node to process the jobs in order from the highest load to the lowest load in accordance with estimation results.

4. A non-transitory computer-readable recording medium having recorded thereon a program for causing a computer to implement a function of an information processing system according to claim 1.

5. The information processing system according to claim 2, wherein the client estimates a processing load per job included in the large-scale arithmetic operation, and requests the master node to process the jobs in order from the highest load to the lowest load in accordance with estimation results.

6. A non-transitory computer-readable recording medium having recorded thereon a program for causing a computer to implement a function of an information processing system according to claim 2.

7. A non-transitory computer-readable recording medium having recorded thereon a program for causing a computer to implement a function of an information processing system according to claim 3.

\* \* \* \* \*